Oct. 18, 1932.   S. SHAFER, JR   1,883,004
CHAIN
Filed Oct. 24, 1928
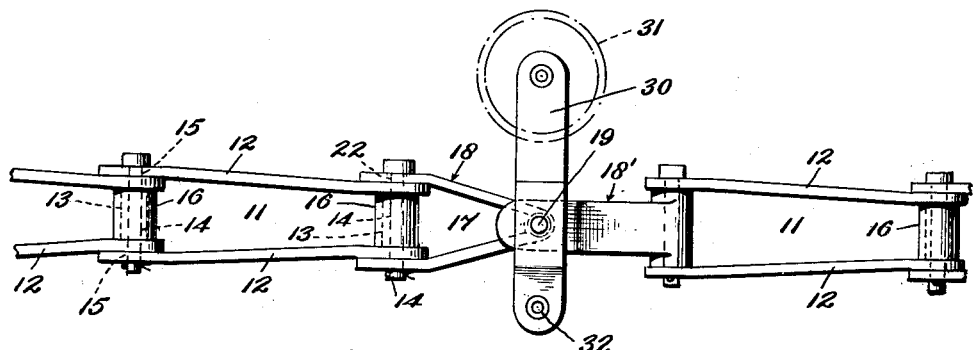
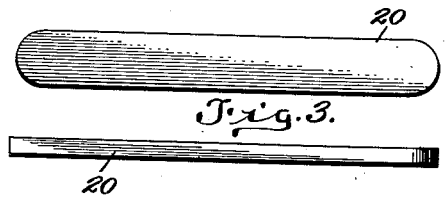
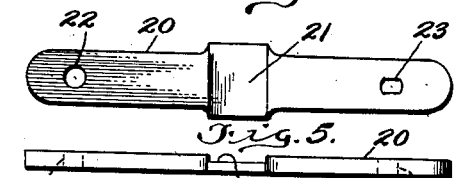
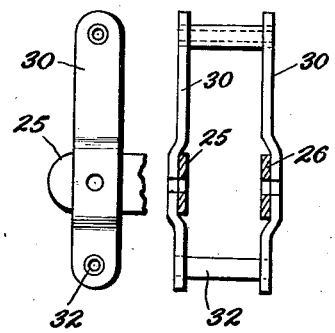
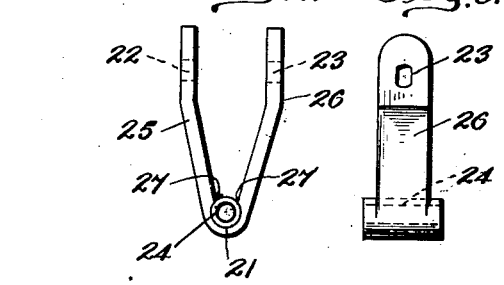
INVENTOR.
Samuel Shafer, Jr.,
BY
ATTORNEYS Patented Oct. 18, 1932

1,883,004

UNITED STATES PATENT OFFICE

SAMUEL SHAFER, JR., OF MILWAUKEE, WISCONSIN, ASSIGNOR TO CHAIN BELT COMPANY, OF MILWAUKEE, WISCONSIN, A CORPORATION OF WISCONSIN

CHAIN

Application filed October 24, 1928. Serial No. 314,713.

The present invention relates to chains, and more particularly to sprocket chains of the compound articulating type such as are now used in trolley conveyers, and has for one of its objects to provide a simple, effective and inexpensive chain link construction which will permit of the articulation of the chain in two planes at substantially right angles to one another.

In certain forms of trolley conveyers, the conveyer chains are trained about sprockets which rotate in horizontal planes about vertical axes, the chain pintles of course being vertical to permit of the articulation of the chains in the horizontal plane about said sprockets. Ordinarily these chains are mounted a considerable distance above the floor in order to clear machinery or other objects thereon; but it is frequently desirable to have the conveyers brought down closer to the floor at certain points along their path, as for loading or discharging. To accomplish this, the chains must articulate in a vertical plane, and to this end it is usual to provide at spaced intervals throughout the length of the chain special links having horizontal pivots about which sections of the chain, comprising a plurality of the ordinary links, may swing in said vertical plane.

The chains are usually of the roller sprocket type, composed of links formed of two steel side bars connected together at one end by a case hardened steel bushing on which is mounted a steel roll. The bushing of one link is received between the free ends of the side bars of the adjacent link, and the parts are pivotally connected by a steel chain pin passing through alined apertures in the bushing and bar ends.

The special links providing for the vertical articulation of the chain sections have heretofore been two malleable iron castings horizontally pivotally connected, and each provided with means whereby it may be vertically pivotally connected to one end or the other of an adjacent steel link, such as above described. The use of malleable castings in this connection is, however, open to the objection that such castings are necessarily much weaker than the steel links; and in actual practice considerable breakage of such castings has occurred.

The present invention has for its principal object the provision of a substitute for these malleable iron cast links, comprising a fabricated steel link which may be easily and cheaply constructed, and which will be as strong as the standard links of the chain. Furthermore, the two essential parts of these fabricated links may be substantial duplicates of one another, further reducing the cost of manufacture.

With the above and other objects in view, which will appear as this description proceeds, the invention consists in the novel details of construction and combinations of parts more fully hereinafter described and particularly pointed out in the appended claims.

Referring to the accompanying drawing, forming part of this specification, in which like reference characters designate like parts in all the views:

Fig. 1 is a side elevational view of a portion of a conveyer chain constructed as above described with a fabricated steel link constructed in accordance with the present invention incorporated therein;

Figs. 2 and 3 are respectively a plan and an edge elevational view of a blank from which the special link elements are formed;

Figs. 4 and 5 are similar views showing the first step in the formation of the elements;

Fig. 6 is an edge elevational view, showing the second step;

Figs. 7 and 8 are respectively side and front elevational views, illustrating the third step; and Figs. 9 and 10 are similar views showing the final step of attaching the straps for mounting the supporting rollers and the article-carrying hooks.

In the said drawing, the conventional chain links are indicated at 11, and are shown as comprising the steel side bars 12, rigidly connected at one end by the hardened steel bushing 13, through which passes the vertical steel pin 14, which likewise passes through openings 15 in the free ends of the side bars 12 of the next adjacent link, as will be readily understood. A steel roller 16 is mounted to freely revolve upon the bushing 13.

The fabricated special links constituting this invention are indicated at 17, Fig. 1, and comprise two substantially V-shaped elements 18 and 18' which are or may be identical with each other, and one of which is turned at right angles to the other whereby they may be horizontally pivotally connected by a steel pin 19. These elements 18 are each formed as illustrated in Figs. 2 to 8 inclusive. That is to say, taking a blank 20 of bar steel, of substantially the shape shown in Figs. 2 and 3, the first step consists in stamping or otherwise depressing the central portion thereof, as indicated at 21 in Figs. 4 and 5. Chain pin holes 22 and 23 are also formed therein adjacent the ends.

A steel bushing 24, similar to the bushings 13 above described, is then positioned in the depressed portion 21, as shown in Fig. 6, after which the opposite arms 25 and 26 are bent upwardly to cause the said depressed portion to closely embrace the bushing, as illustrated in Figs. 7 and 8. The parts are then permanently united at the points 27 by electric or autogenous welding.

As above stated, two of these elements are combined to provide a horizontally pivoting link for the conveyer chain. As clearly shown in Fig. 1, one element 18 is positioned with the spaced ends of its arms 25 and 26 embracing the bushing end of one of the conventional links 11, with the apertures 22 and 23 in alinement with the bore of the bushing 13, and a chain pin 14 is passed through these alined openings and suitably secured against unintentional displacement. The axis of the bushing 24 of this element 18 is thus disposed horizontally, and the second element 18' is turned at right angles to the first element so that the spaced ends of its arms 25 and 26 may embrace the bushing 24 of the first element, with their apertures 22 and 23 alined with the bore of said bushing. The bushing 24 of the element 18' is of course disposed in a vertical plane in position to be embraced by and pivotally secured to the free ends of the side bars 12 of the next adjacent conventional link 11. The elements 18 and 18' are connected by the pin 19, which provides a horizontal pivot about which the chain sections may articulate in a vertical plane, as will be readily understood.

For mounting the chain supporting trolley rollers and the article-carrying hooks or members, vertical bars or straps 30 may be welded or otherwise secured to the arms 25 and 26 of the element 18', as shown in Figs. 1, 9 and 10. Trolley rollers 31 are mounted at the upper end of these upright members, while the article supporting members are pivotally mounted on the bushings or studs 32 at the lower end thereof.

While the formation of the depression 21 has been described, it is not essential, as its principal function is merely to keep the diameter of the pintle portion of the element 18 the same as that of the rollers 16.

It will be noted in Fig. 1 that the ends of the arms 25 and 26 extend some distance beyond the chain pin holes 22 and 23. This provides a bearing surface of large area between the said arms and the side bars 12 of the conventional link 11, thereby further strengthening the chain and preventing flexing thereof in a vertical plane at this point.

It will be obvious that those skilled in the art may vary the details of construction, as well as the precise arrangement of parts, without departing from the spirit of the invention, and therefore it is not wished to be limited to the above disclosure, except as may be required by the claims.

What is claimed is:

1. A link for compound articulating steel side bar sprocket chains for trolley conveyers and the like, comprising a pair of identical elements each composed of a bar reversely bent to provide a pair of spaced arms having alined chain-pin holes, and a tubular bushing embraced by and rigidly secured to the reverse bend of said bar, said bushings being of a length to be freely received between the spaced arms of an adjacent link member, one of said elements being disposed at substantially right angles to the other element with the end portions of its arms outside the ends of the bushing of said other element and its chain-pin holes in alinement with the bore of said bushing; a chain pin passing through said alined holes and bore, providing a readily removable pivotal connection between the elements; and means for supporting said link on a trackway.

2. An element for compound articulating sprocket chain links comprising an elongated bar having a depressed portion intermediate its ends and bent upon itself at said depressed portion to provide a pair of spaced arms; and a tubular bushing embraced by and secured to said depressed portion.

In testimony whereof I affix my signature.

SAMUEL SHAFER, Jr.